United States Patent [19]
Haesaert et al.

[11] Patent Number: 6,106,002
[45] Date of Patent: Aug. 22, 2000

[54] AIR-BAG ARRANGEMENT

[75] Inventors: Charles Haesaert, Fresnoy Folny; Bernard Dechoux, Gournay en Bray, both of France

[73] Assignee: Autoliv Development Ab, Sweden

[21] Appl. No.: 09/323,138

[22] Filed: Jun. 1, 1999

[30] Foreign Application Priority Data

Nov. 6, 1998 [GB] United Kingdom .................. 9824427

[51] Int. Cl.[7] ............................................. B60R 21/26
[52] U.S. Cl. ...................... 280/728.2; 280/736; 280/740
[58] Field of Search ............................. 280/728.2, 736, 280/740, 741, 742

[56] References Cited

U.S. PATENT DOCUMENTS

| Re. 30,327 | 7/1980 | Damon | 280/740 |
|---|---|---|---|
| 3,797,853 | 3/1974 | Grosch et al. | 280/740 |
| 3,984,126 | 10/1976 | Goetz et al. | 280/740 |
| 4,178,017 | 12/1979 | Ishi et al. | 280/740 |
| 5,234,229 | 8/1993 | Gordon | 280/736 |
| 5,673,930 | 10/1997 | Coleman | 280/728.2 |
| 5,931,492 | 8/1999 | Mueller et al. | 280/728.2 |

*Primary Examiner*—Peter C. English
*Assistant Examiner*—Ruth Ilan
*Attorney, Agent, or Firm*—Venable; George H. Spencer; Robert Kinberg

[57] ABSTRACT

An air-bag unit comprises a support plate (2) having an aperture (4) in it, and an air-bag (14) which also has an aperture (16) formed in it. A gas generator (7) has a radially outwardly extending flange (8) which is located so that a region (15) of the air-bag (14) surrounding the aperture (16) formed therein is trapped between the flange (8) and the support plate (2). A gas diffuser (10) is provided which, together with the flange (8) defines a diffusion chamber (18), the arrangement being such that in use of the device, gas from the gas generator (8) is injected into the diffusion chamber (18). A plurality of elongate connector elements (17) extend from a part of the gas diffuser (10) through the flange (8) and through the region (15) of the air-bag surrounding the aperture, also passing through apertures formed in the plate (2) so that the distance between the said portion of the diffuser (10) and the support plate is variable. In use, the diffuser (10) and flange (8) move apart and the air-bag is firmly gripped between the flange (8) and the plate (2).

11 Claims, 2 Drawing Sheets

AIR-BAG ARRANGEMENT

BACKGROUND OF THE INVENTION

The present invention relates to an air-bag arrangement, and more particularly relates to an air-bag arrangement intended to provide protection for an occupant of a motor vehicle, such as a motor car.

It has been proposed previously to provide an air-bag in a motor vehicle, such as a motor car, the air-bag being adapted to be inflated in the event that an accident should occur so that the inflated air-bag is positioned to provide some protection for the driver or occupant of the motor vehicle.

One typical air-bag arrangement incorporates a support plate, there being a gas generator having a radially outwardly extending flange which is connected to the support plate, by means of securing bolts or the like. An annular region of an air-bag surrounding an aperture formed in the air-bag is trapped between the support plate and the flange of the gas generator Because it is desired to provide a gas-tight seal around the opening formed in the air-bag, the support plate and the flange on the gas generator are secured very tightly together with the said region of the bag surrounding the aperture formed in the bag being squeezed between the support plate and the flange.

It has been found, however, that if an air-bag, formed of a conventional fabric material, is subjected to a substantial compressional force for a long period of time, the fabric may deform or be damaged. Thus the fabric trapped between the plate and the flange may deteriorate, subsequently providing a flow-path through which gas may leak.

SUMMARY OF THE INVENTION

The present invention seeks to provide an improved air-bag arrangement.

According to this invention there is provided an air-bag unit, the air-bag unit comprising a support plate; an air-bag, the air-bag having an aperture therein, the portion of the air-bag surrounding the aperture being located adjacent a predetermined region of the support plate; an element incorporating a flange, the flange being located adjacent the portion of the air-bag defining the aperture so that said portion of the air-bag is positioned between the flange and the support plate; and a gas diffuser, the gas diffuser, together with said flange, defining a diffusion chamber; the gas diffuser incorporating a portion located adjacent said flange, the said portion being associated with a plurality of elongate connector elements which extend through the flange and through the portion of the air-bag surrounding the aperture therein, and through the support plate, the connecting elements being configured so that the distance between the said portion of the diffuser and the support plate is variable, but restricted; the air-bag unit further comprising a source of gas adapted to be activated in response to a predetermined signal to supply gas to the diffusion chamber, the arrangement being such that, in use, the said portion of the diffuser and the flange move apart in response to an increase of gas pressure within the diffusion chamber, with the flange and the support plate being biased towards each other to grip said portion of the air-bag, the arrangement also being such that, in use, a gas flow path exists between the diffusion chamber and the interior of the air-bag.

Preferably the flange is deformable so that, in response to an increase of gas pressure within the diffusion chamber, the flange is distorted towards the support plate.

Conveniently the gas diffuser is deformable so that, in response to an increase of gas pressure within the diffusion chamber, the gas diffuser deforms thus applying, through the connector elements, a force to the support plate biasing the support plate towards the flange.

Advantageously the gas diffuser defines a peripheral lip which initially is located adjacent said flange, the arrangement being such that, in use, in response to an increase of gas pressure within the diffusion chamber the lip moves away from the flange to create said gas flow path between the diffusion chamber, and the interior of the air-bag.

Alternatively the gas diffuser is provided with one or more apertures therein forming said gas flow path between the diffusion chamber and the interior of the air-bag.

Conveniently the source of gas comprises a gas generator containing a pyrotechnic charge and having a gas generator housing incorporating said flange.

In one embodiment the gas generator comprises a cylindrical housing containing said pyrotechnic charge, and said flange extends radially outwardly from said housing, the gas diffuser comprising a substantially flat plate secured to part of the gas generator housing, said plate carrying a depending peripheral wall, the wall carrying at its terminal end an outwardly directed lip which constitutes said portion of the diffuser.

In an alternative embodiment the gas generator housing is of substantially rectangular form defining a central channel which receives a gas generator in the form of a cylindrical canister, the gas diffuser comprising an element of rectangular form, the peripheral part of which constitutes the said portion of the diffuser.

Conveniently each connector element is constituted by a bolt and an associated nut.

Alternatively each connector element is constituted by a stud and a nut.

Preferably each stud has each end thereof fixed to the said portion of the diffuser.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
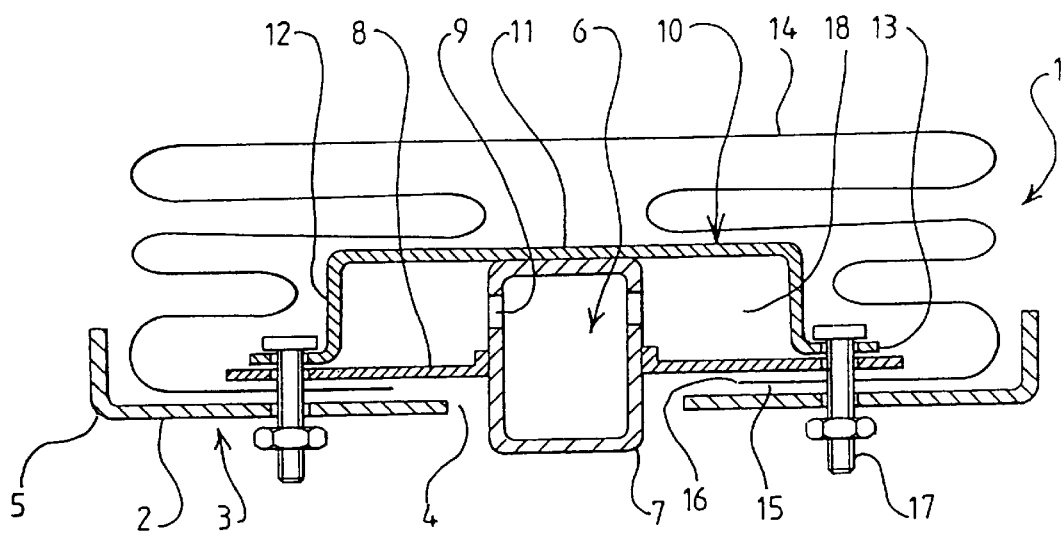
FIG. 1 is a cross-sectional view of an air-bag arrangement in accordance with the invention.

Referring initially to FIG. 1, an air-bag arrangement 1 comprises a support plate 2. The plate 2 may form part of a housing. The plate 2 defines a substantially planar region 3 in the centre of which is defined a round aperture 4. In its peripheral region the plate 2 is provided with an upstanding flange 5.

A gas generator 6 is provided. The gas generator 6 comprises a central vertical substantially cylindrical housing 7 which contains a pyrotechnic material. A radially outwardly extending horizontal flange 8 is provided which is connected substantially to the mid point of the cylindrical housing 7. Above the flange 8, the housing 7 is provided with a plurality of gas outlet ports 9 each defining a flow path extending from the interior of the housing 7 to the exterior of the housing. The upper part of the housing 7 is connected to a gas diffuser 10. The gas diffuser 10 comprises a planar upper wall 11, the central region of which is secured to the upper part of the housing 7. The wall 11 extends to either side of the housing 7 and carries a peripheral depending side wall 12. The lower end of the side wall 12 carries a radially outwardly directed flange, which forms an outwardly directed lip 13.

An air-bag 14 is provided, which is adapted to be supplied with gas from the gas generator 6. The air-bag 14 incorporates a region 15 which surrounds an aperture 16 formed in the air-bag. The region 15 is located in position so that the aperture 16 is substantially co-aligned with the aperture 4 formed in the plate 2, the region 15 of the air-bag 14 surrounding the aperture 16 thus being located between the peripheral part of the flange 8 carried by the gas generator 6 and the planar portion 3 of the plate 2.

A series of co-aligned apertures are formed, at substantially evenly spaced intervals, in the peripheral outwardly extending lip 13 carried by the gas diffuser 10, the flange 8 carried by the gas generator 6, the region 15 of the air-bag 14 surrounding the aperture 16 formed therein, and the planar region 3 of the plate 2 surrounding the aperture 4.

A plurality of elongate fastening elements 17, such as nuts and bolts, are provided which extend through the co-aligned apertures and which serve to connect together the gas diffusers 10, the gas generator 6 and the plate or housing 2 whilst trapping, between the gas generator 6 and the plate or housing 2, part of the air-bag 14 surrounding the aperture 16 formed therein. The heads of the bolts may be fixed to the outwardly directed lip 13.

The elongate fastening elements are of such a length that they are not secured sufficiently tightly to compress that part 15 of the air-bag 14 which is trapped between the flange 8 carried by the gas generator 6 and the planar portion 3 of the plate 2. Because the fastening elements are not secured tightly, the fabric of the air-bag is not compressed and thus does not deteriorate due to compression. The elongate fastening elements permit relative movement between the lip 13, the flange 8 of the gas generator housing and the plate 2.

It is to be observed that a diffusion chamber 18 is defined which is partly bounded by the diffuser 10, and which is partly bounded by the gas generator housing 7 which carries the flange 8. The diffusion chamber 18 is in communication with the gas outlet ports 9 from the housing 7 of the gas generator 6. The chamber 18 is initially substantially sealed by the engagement of the lip 13 carried by the dependent side wall 12 of the diffuser 10, and the radially outwardly extending flange 8 carried by the housing 7 of the gas generator 6, of the close proximity of the lip 13 and the flange 8.

Figure 2:
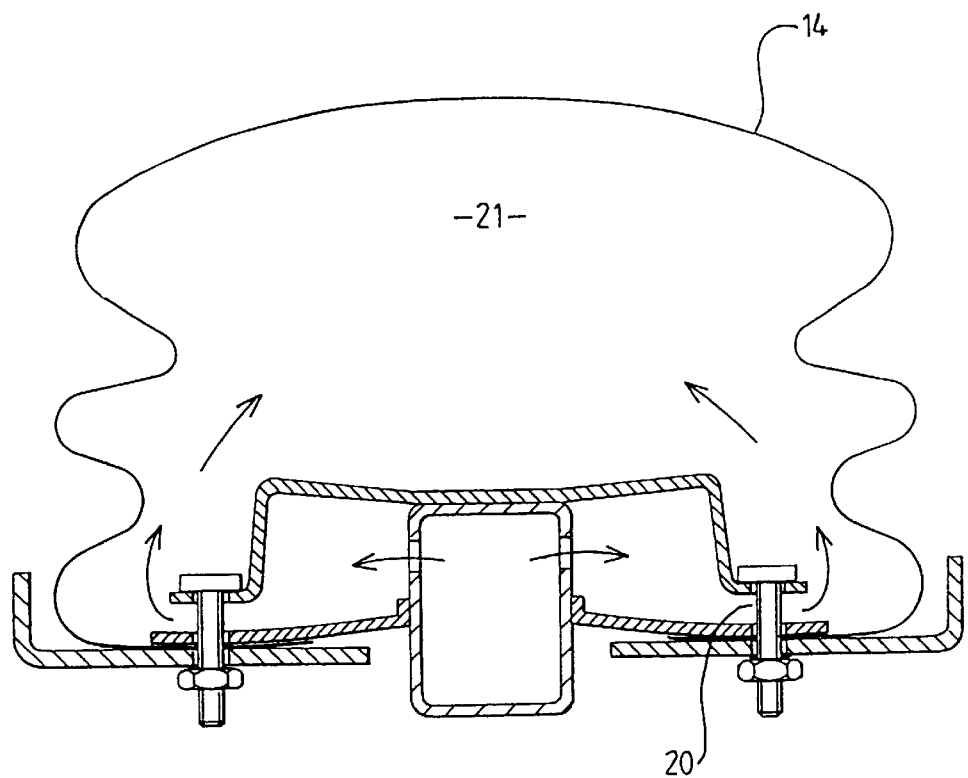
FIG. 2 is a view corresponding to FIG. 1 illustrating the arrangement of FIG. 1 on activation of the gas generator.

Referring now to FIG. 2, in the event that an accident should arise, a pyrotechnic charge (not shown) located within the housing 7 will be ignited in response to a signal from a sensor which senses a parameter indicative of the occurrence of an accident. Gas generated by the pyrotechnic material will flow through the gas outlet powers 9 formed in the housing 7, and consequently gas will flow into the gas diffusion chamber 18. The pressure of gas within the gas diffuser chamber 18 will rise, and as a consequence of the pressure rise the flange 8 carried by the housing 7 is distorted downwardly towards the planar portion 3 of the plate or housing 2, thus compressing the region 15 of the fabric forming the air-bag 14 that surrounds the aperture 16 formed in the air-bag. Simultaneously, the material forming the gas diffuser 10 may be distorted so that the lip 13 carried by the depending side wall 12 of the gas diffuser 10 is moved away from the flange 8 carried by the gas generator 6. This distortion of the gas diffuser 10 provides all upward force on the fastening elements 17, thus drawing the plate 2 towards the flange 8, thus compressing the region 15 of fabric surrounding the aperture 16 in the air-bag 14. It is to be appreciated that in the illustrated embodiment either the flange 8 will distort, or the gas diffuser 10 will distort, or both the flange 8 and the gas diffuser 10 will distort.

It is thus to be appreciated that, in use of the air-bag unit, the gas generator is activated in response to a predetermined signal to supply gas to the diffusion chamber, and consequently there is an increase of gas pressure within the diffusion chamber. This increase of gas pressure causes part of the diffuser 10, including lip 13, and the flange 8 to move apart. Thus the flange 8 and the support plate are biased towards each other to grip the region 15 of the air-bag 14 surrounding the aperture 16. As the lip 13 moves away from the flange 8 carried by the gas generator, an annular gas flow path 20 is created communicating with the interior of the air-bag.

There are two consequences of the distortion of either the flange 8 or the gas diffuser 10, or both the flange 8 and the gas diffuser 10. Firstly, the flange 8 and plate 2 are biased towards each other so that the region 15 of the air-bag surrounding the aperture 16 formed therein is firmly gripped to provide a gas-tight seal. Secondly, an annular gas flow path 20 is created between the flange 8 and the lip 13 extending from the diffuser chamber 18 to the interior 21 of the air-bag 14, Gas thus flows into the air-bag 14, which is inflated.

Thus, in the described embodiment, initially the flange 8 carried by the gas generator and the plate 2 need not be very firmly biased towards each other, so that the fabric of the air-bag is not subjected to forces that might deform or damage the fabric.

Figure 3:
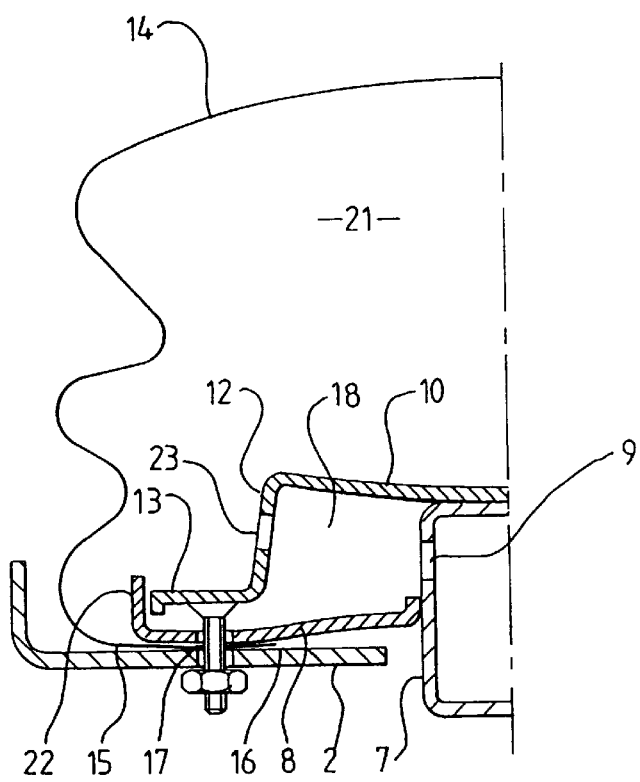
FIG. 3 is a view corresponding to FIG. 2 but showing a modified embodiment of the invention.

FIG. 3 illustrates a modified embodiment of the invention that has been described above with reference to FIGS. 1 and 2. Certain parts of the embodiment of FIG. 3 are the same as corresponding parts of the embodiment of FIGS. 1 and 2. These parts will be identified by the same reference numbers as used in FIGS. 1 and 2, and will not be re-described in detail.

In the embodiment of FIG. 3, the flange 8 provided on the housing 7 of the gas generator is provided with a peripheral upstanding rim 22, the rim being located adjacent the free edge of the lip 13 carried by the diffuser. The depending side wall 12 of the diffuser 10 is provided with a plurality of apertures 23 evenly spaced around the periphery of the diffuser. In an alternative embodiment one relatively large aperture may be provided.

The fastening elements 17 are, in this embodiment, in the form of elongate threaded studs which are welded, or otherwise secured, to the under-side of the lip 13 provided on the diffuser 10, meaning that the lip 13 need not be provided with the apertures that were present in the lip 13 in the embodiment of FIGS. 1 and 2.

FIG. 3 illustrates the described embodiment in the condition that it will occupy when a pyrotechnic charge located within the housing 7 has been ignited. Gas from the housing 7 will flow through the gas outlet ports 9 into the gas diffusion chamber 18. The rate of flow of gas is such that even though some gas will escape from the diffuser chamber 18 through the apertures 23 into the interior 21 of the air-bag, nevertheless the gas pressure within the chamber 18 will rise, causing distortion of either the gas diffuser 10 or the flange 8, or both the gas diffuser 10 and the flange 8 with the consequence that the flange 8 and the plate 2 are biased towards one another, thus compressing the region 15 of fabric surrounding the aperture 16 in the air-bag 14. However, the distortion of the components of the described embodiment does not create an annular gas flow path extending from the diffuser chamber 18 to the interior 21 of the air-bag 14. Instead, the flow path from the diffuser chamber 18 to the interior 21 of the air-bag 14 is defined solely by the apertures 23.

Figure 4:
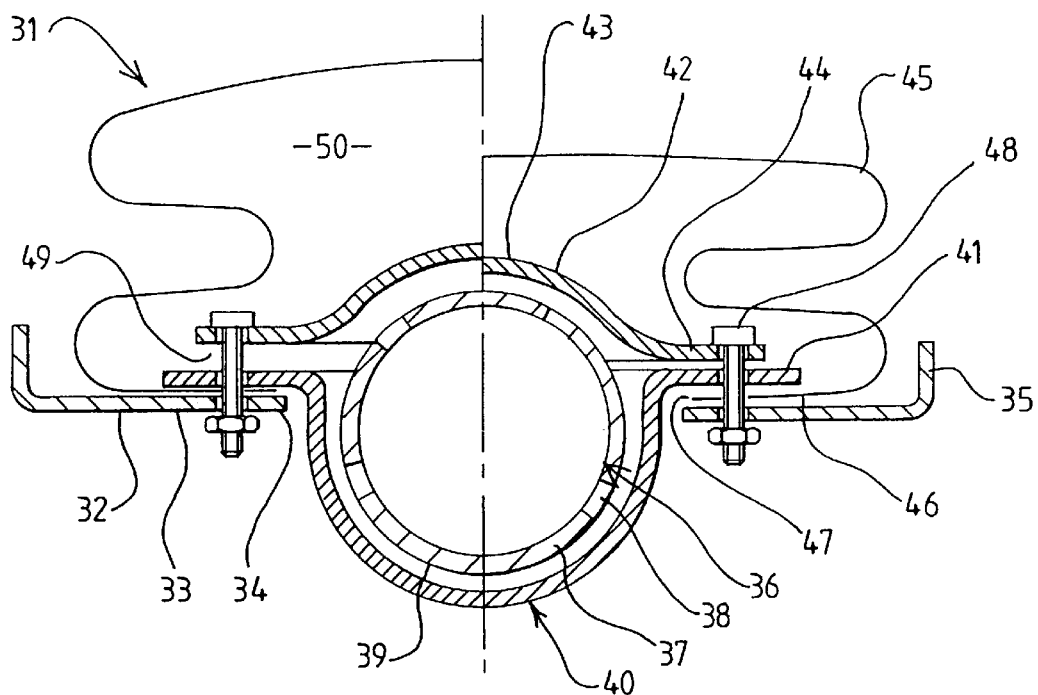
FIG. 4 is a sectional view of a further air-bag arrangement in accordance with the present invention, the right-hand part of the figure showing the arrangement before the gas generator is activated, and the left-hand part of the figure showing the arrangement after the gas generator has been activated.

FIG. 4 illustrates a further, different, embodiment of the invention. Referring now to FIG. 4, an air-bag arrangement 31 is illustrated which comprises a planar support plate 32. The plate 32 may form part of a housing. The plate 32 defines a substantially planar region 33 in the centre of which is defined an elongate generally rectangular aperture 34. In its peripheral region the plate 32 is provided with an upstanding flange 35.

A gas generator 36 is provided. The gas generator comprises an elongate generally cylindrical casing 37, the casing defining a plurality of apertures 38 providing a gas flow path extending from the interior of the casing. The casing 37 contains a pyrotechnic material. The gas generator 36 is contained within a gas diffusion chamber 39. The gas diffusion chamber 39 is partly defined by a gas diffuser housing 40. The gas generator housing 40 comprises an elongate element which defines an elongate recess of generally "U"-shaped cross-section, adapted to receive the generally cylindrical casing 37 of the gas generator 36, the element also having a generally rectangular outwardly extending peripheral flange 41. The gas generator housing 40 is dimensioned so that the part thereof defining the recess may be inserted through the aperture 34 formed in the planar region 33 of the plate 32, with the flange 41 lying above the planar portion 33 of the plate 32.

The gas diffusion chamber 39 is also partly defined by a gas diffuser 42. The gas diffuser 42 comprises an element having a central region 43 which is upwardly arched with an inverted "U" configuration, and having a peripheral outwardly directed generally rectangular planar lip 44 adapted to lie above the flange 41.

An air-bag 45 is provided adapted to be supplied with gas from the gas generator 36. The air-bag 45 incorporates a region 46 which surrounds a rectangular aperture 47 which is formed in the air-bag. The region 46 is located in position so that the aperture 47 formed in the air-bag is substantially co-aligned with the aperture 34 formed in the planar region 33 of the plate 32. Thus, the region 46 of the fabric forming the air-bag 45 is located between the planar portion 33 of the plate 32, and the flange 41 carried by the gas generator housing 40.

A series of co-aligned apertures are formed, at substantially evenly spaced intervals, in the peripheral outwardly extending lip 44 carried by the gas diffuser 42, the flange 41 carried by the gas generator housing 40, and in the region 46 of the fabric of the air-bag 45 surrounding the aperture 47 formed therein, and also in the planar region of the plate 32 surrounding the aperture 34.

A plurality of elongate fastening elements 48, such as nuts and bolts, are provided which extend through the apertures, and which serve to connect together the gas diffuser 42, the gas generator ho using 40, and the plate be 32 whilst trapping between the flange 41 of the gas generator housing 40 and the plate 32 part of the fabric of the air-bag 45 surrounding the aperture 47 formed therein. The heads of the bolts may be fixed to the outwardly directed lip 44 of the gas diffuser 10. Alternatively, the bolts may be replaced by threaded studs which are welded or otherwise secured to the under-surface of the lip 44 provided on the gas diffuser 42, the lip 44 of the gas diffuser 42 then not being provided with the described apertures. The elongate fastening elements permit relative movement between the lip 44, the flange 41 of the gas generator housing 40 and the plate 32.

The elongate fastening elements are of such a length that they are not secured sufficiently tightly to compress that part 46 of the air-bag 45 which is trapped between the flange 41 provided on the gas generator housing 40, and the planar portion 33 of the plate 32. Because the fastening elements are not secured tightly, the fabric of the air-bag is not compressed, and thus does not deteriorate due to compression.

The diffusion chamber 39, which is partly bounded by the gas diffuser 42, and which is also partly bounded by the gas generator housing 40 which carries the flange 41, is in communication with the gas outlet ports of the gas generator 36 defined by the apertures 38 formed in the cylindrical casing 37. The gas diffusion chamber 39 is initially substantially sealed by the engagement of the lip 44 carried by the gas diffuser 42, and the radially outwardly extending flange 41 called by the gas generator housing 40.

Should an accident arise, the pyrotechnic material located within the gas generator 36 will be ignited in response to a signal from a sensor which senses a parameter indicative of the occurrence of an accident. Gas generated by the pyrotechnic material will flow through the apertures 36 formed in the casing 37 into the gas diffusion chamber 39. The pressure of gas within the gas diffusion chamber 39 will rise, and as a consequence of the pressure rise, the flange 41 of the gas generator housing 40 will be moved downwardly towards the planar portion 33 of the plate 32, thus compressing the region 46 of the fabric forming the air-bag 45 that surrounds the aperture 47 formed in the air-bag. Simultaneously, the material forming the gas diffuser 42 may be moved upwardly so that the peripheral flange 44 carried by the gas diffuser 42 is moved away from the flange 41 of the gas generator housing 40. This movement of the gas diffuser 42 provides an upward force on the fastening elements 17, thus drawing the plate 32 towards the flange 41, consequently compressing the region 46 of fabric surrounding the aperture 47 formed in the air-bag 45.

There are two consequences of the described movements. Firstly, the flange 41 and the plate 32 are biased towards each other so that the region 46 of the air-bag surrounding the aperture 47 formed therein is firmly gripped to provide a gas-tight seal. Secondly, a gas flow path 49 is created between the flange 41 and the lip 44 extending from the diffusion chamber 39 to the interior 50 of the air-bag 45, which is thus inflated. Thus, in this embodiment, initially the flange 41 carried by the gas generator housing 40, and the plate 32 need not be very firmly biased towards each other, so that the fabric of the air-bag is not subjected to forced that might deform or damage the fabric.

Whilst, in the embodiment of FIG. 4 the components are not deformable, in a modification of this embodiment some components could be deformable.

What is claimed is:

1. An air-bag unit, the air-bag unit comprising a support plate; an air-bag, the air-bag having an aperture therein, the portion of the air-bag surrounding the aperture being located adjacent a predetermined region of the support plate; an element incorporating a flange, the flange being located adjacent the portion of the air-bag defining the aperture so that said portion of the air-bag is positioned between the flange and the support plate; and a gas diffuser, the gas diffuser, together with, said flange, defining a diffusion chamber; the gas diffuser having a portion located adjacent said flange, the gas diffuser portion being associated with a plurality of elongate connector elements which extend through the flange and through the portion of the air-bag surrounding the aperture therein, and through the support plate, the connecting elements being configured so that the distance between the portion of the diffuser and the support plate is variable, but restricted; the air-bag unit further comprising a source of gas adapted to be activated in response to a predetermined signal to supply gas to the diffusion chamber, the arrangement being such that, in use, the portion of the diffuser and the flange move apart in response to an increase of gas pressure within the diffusion chamber, with the flange and the support plate being biased towards each other to grip said portion of the air-bag, the arrangement also being such that, in use, a gas flow path exists between the diffusion chamber and the interior of the air-bag.

2. A unit according to claim 1 wherein the flange is deformable so that, in response to an increase of gas pressure within the diffusion chamber, the flange is distorted towards the support plate.

3. A unit according to claim 1 wherein the gas diffuser is deformable so that, in response to an increase of gas pressure within the diffusion chamber, the gas diffuser deforms thus applying, through the connector elements, a force to the support plate biasing the support plate towards the flange.

4. A unit according to claim 1 wherein the gas diffuser defines a peripheral lip which initially is located adjacent said flange, the arrangement being such that, in use, in response to an increase of gas pressure within the diffusion chamber the lip moves away from the flange to create said gas flow path between the diffusion chamber, and the interior of the air-bag.

5. A unit according to claim 1 wherein the gas diffuser is provided with one or more apertures therein forming said gas flow path between the diffusion chamber and the interior of the air-bag.

6. A unit according to claim 1 wherein the source of gas comprises a gas generator containing a pyrotechnic charge and having a gas generator housing incorporating said flange.

7. A unit according to claim 6 wherein the gas generator comprises a cylindrical housing containing said pyrotechnic charge, and said flange extends radially outwardly from said housing, the gas diffuser comprising a substantially flat plate secured to part of the gas generator housing, said plate carrying a depending peripheral wall, the wall carrying at its terminal end an outwardly directed lip which constitutes said portion of the diffuser.

8. A unit according to claim 6 wherein the gas generator housing is of substantially rectangular form defining a central channel which receives the gas generator in the form of a cylindrical canister, the gas diffuser comprising an element of rectangular form, the peripheral part of which constitutes the position of the diffuser.

9. A unit according to claim 1 wherein each connector element is constituted by a bolt and an associated nut.

10. A unit according to claim 1 wherein each connector element is constituted by a stud and a nut.

11. A unit according to claim 10 wherein each stud has an end thereof fixed to the portion of the diffuser.

* * * * *